(12) United States Patent
Nishikawa et al.

(10) Patent No.: US 7,412,150 B2
(45) Date of Patent: Aug. 12, 2008

(54) METHOD AND APPARATUS FOR FACILITATING PROGRAM DATA ACQUISITION

(75) Inventors: Yuko Nishikawa, La Jolla, CA (US); Aaron John Dew, San Diego, CA (US); Michael A. Bergeron, Poway, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 589 days.

(21) Appl. No.: 11/063,448

(22) Filed: Feb. 23, 2005

(65) Prior Publication Data
US 2006/0078298 A1   Apr. 13, 2006

Related U.S. Application Data

(60) Provisional application No. 60/614,063, filed on Sep. 28, 2004.

(51) Int. Cl.
*H04N 5/445* (2006.01)
(52) U.S. Cl. .......................... 386/83; 725/50
(58) Field of Classification Search ................ 348/730, 348/731, 554, 460, 465, 564, 569, 725; 725/86, 725/58, 50; 386/83
See application file for complete search history.

(56) References Cited

U.S. PATENT DOCUMENTS

| | | | |
|---|---|---|---|
| 6,337,719 B1* | 1/2002 | Cuccia | 348/731 |
| 6,452,644 B1* | 9/2002 | Shimakawa et al. | 348/730 |
| 2006/0082690 A1* | 4/2006 | Englert | 348/731 |
| 2006/0271971 A1* | 11/2006 | Drazin | 725/86 |

FOREIGN PATENT DOCUMENTS

JP     360127821 A  *  7/1985

* cited by examiner

*Primary Examiner*—David E Harvey
(74) *Attorney, Agent, or Firm*—Crowell & Moring LLP

(57) ABSTRACT

Methods and apparatus for facilitating program data acquisition. In one embodiment, a set-top box is set to enter an auto-off state based on a user-defined auto-off time. Once the set-top box has entered the auto-off state, a channel from which program guide data may be obtained may be automatically tune to. The auto-off state may be automatically exited in order to either respond to a user interaction or to avoid missing previously-programmed recordings. Upon exiting the auto-off state, the set-top box may be tuned back to the channel that it was tuned to prior to entering the auto-off state.

14 Claims, 5 Drawing Sheets

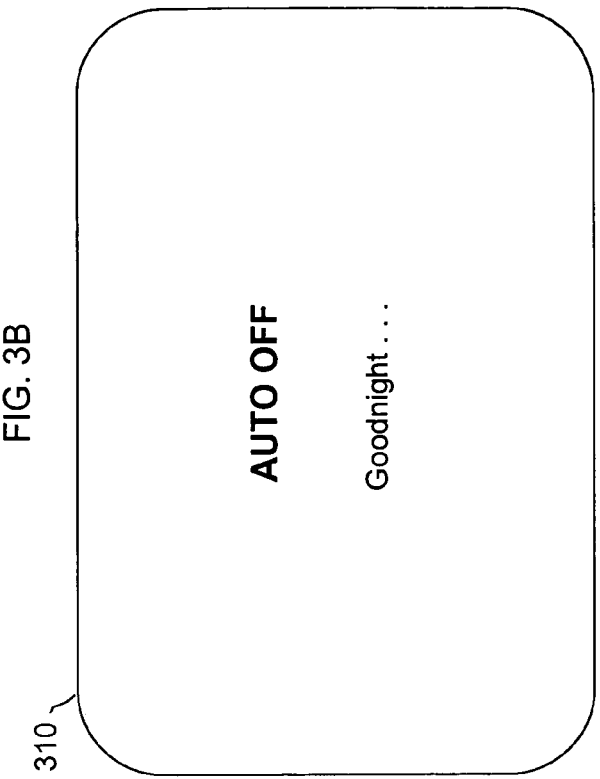
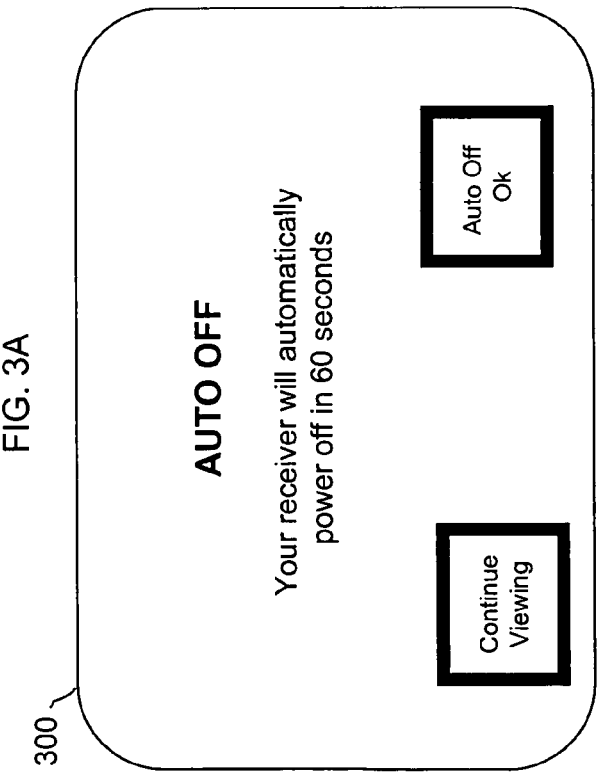

METHOD AND APPARATUS FOR FACILITATING PROGRAM DATA ACQUISITION

CROSS REFERENCE TO RELATED APPLICATION

This application claims priority to U.S. Provisional Patent Application Ser. No. 60/614,063 filed on Sep. 28, 2004.

FIELD OF THE INVENTION

This invention relates generally to program data acquisition, and in particular to improved functionality for acquiring program guide data during an auto-off period.

BACKGROUND OF THE INVENTION

The Video Cassette Recorder (VCR) has changed the lives of television (TV) viewers by allowing viewers to time-shift TV programs to match their lifestyles. Using the VCR, the viewer stores programs onto magnetic tape; this can then be played back at the viewer's convenience. The VCR gives the viewer the ability to pause the program playback whenever he desires, fast-forward through unwanted program material or commercials, and to replay favorite scenes. However, a VCR cannot both capture and play back information at the same time.

The use of a digital computer system to solve this problem has been suggested. U.S. Pat. No. 5,371,551 issued to Logan et al., on Dec. 6, 1994, teaches a method for concurrent video recording and playback. It presents a microprocessor-controlled broadcast and playback device. However, the approach requires that the microprocessor and hard disk must be very fast in order to keep up with high video rates found in television transmission.

The use of a multimedia time-warping system to solve this problem has been suggested. U.S. Pat. No. 6,233,389 issued to Barton et al. on May 15, 2001 teaches such a system, which utilizes the approach that decouples the microprocessor from the high video data rates, thereby reducing the microprocessor and system requirements, which are at a premium. The common name employed in the art to describe such a multimedia time-warping system is Digital Video Recorder (DVR). DVR systems typically provide the ability to navigate through content which has been stored or cached. Such navigation may include, for example, fast forwarding or reversing through a stored program.

Set-top boxes, whether equipped with DVR functionality or not, must sometimes tune to a particular channel in order to acquire program guide data. Moreover, the set-top box must sometimes be in a stand-by mode as well. Since acquiring fresh program data can take several hours, and since program data should be performed daily, there is a need for an improved method and apparatus which minimizes viewer impact. In the case of a DVR set-top box, there is the added need for an improved method and apparatus for acquiring program guide data while not interfering with previously-scheduled DVR recordings.

SUMMARY OF THE INVENTION

Methods and apparatus for facilitating program data acquisition. In one embodiment, a method for receiving program guide data during a stand-by mode of a digital video recorder includes entering the stand-by mode at a user-defined time, tuning from a first channel to a program data channel, and receiving program guide data from the program data channel. The method further includes detecting a user interaction, and tuning back to the first channel in response to the user interaction.

Other aspects, features, and techniques of the invention will be apparent to one skilled in the relevant art in view of the following detailed description.

BRIEF DESCRIPTION OF THE DRAWINGS

FIGS. 3A-3B are embodiments graphical user interface screens notifying a user of auto-off conditions;

DETAILED DESCRIPTION OF THE EXEMPLARY EMBODIMENTS

One aspect of the invention is to facilitate program guide data acquisition of a DVR-enabled set-top box. In one embodiment, a set-top (e.g., DVR-type device) is set to enter an auto-off state (also referred to as a stand-by state) based on a user-defined auto-off time. In another embodiment, a user may be able to delay the auto-off state until after program viewing has stopped, or until after a previously-programmed recording has been completed.

Once the set-top box has entered the auto-off state, another aspect of the invention is to automatically tune the set-top box to a channel from which program guide data may be obtained. By way of a non-limiting example, Gemstar™ systems require that a particular channel be tuned to in order for the system to acquire new program guide data. In one embodiment, a hard drive of the set-top box may be powered down (e.g., hard drive spin down) while the new program guide data is being acquired.

Another aspect of the invention is to automatically exit the auto-off state in order to either respond to a user interaction or to avoid missing previously-programmed recordings. In one embodiment, when powered up the set-top box may be tuned back to the last station that was tuned to prior to entering the auto-off state. Additional features and embodiments will be described below with reference to the figures.

Figure 1:
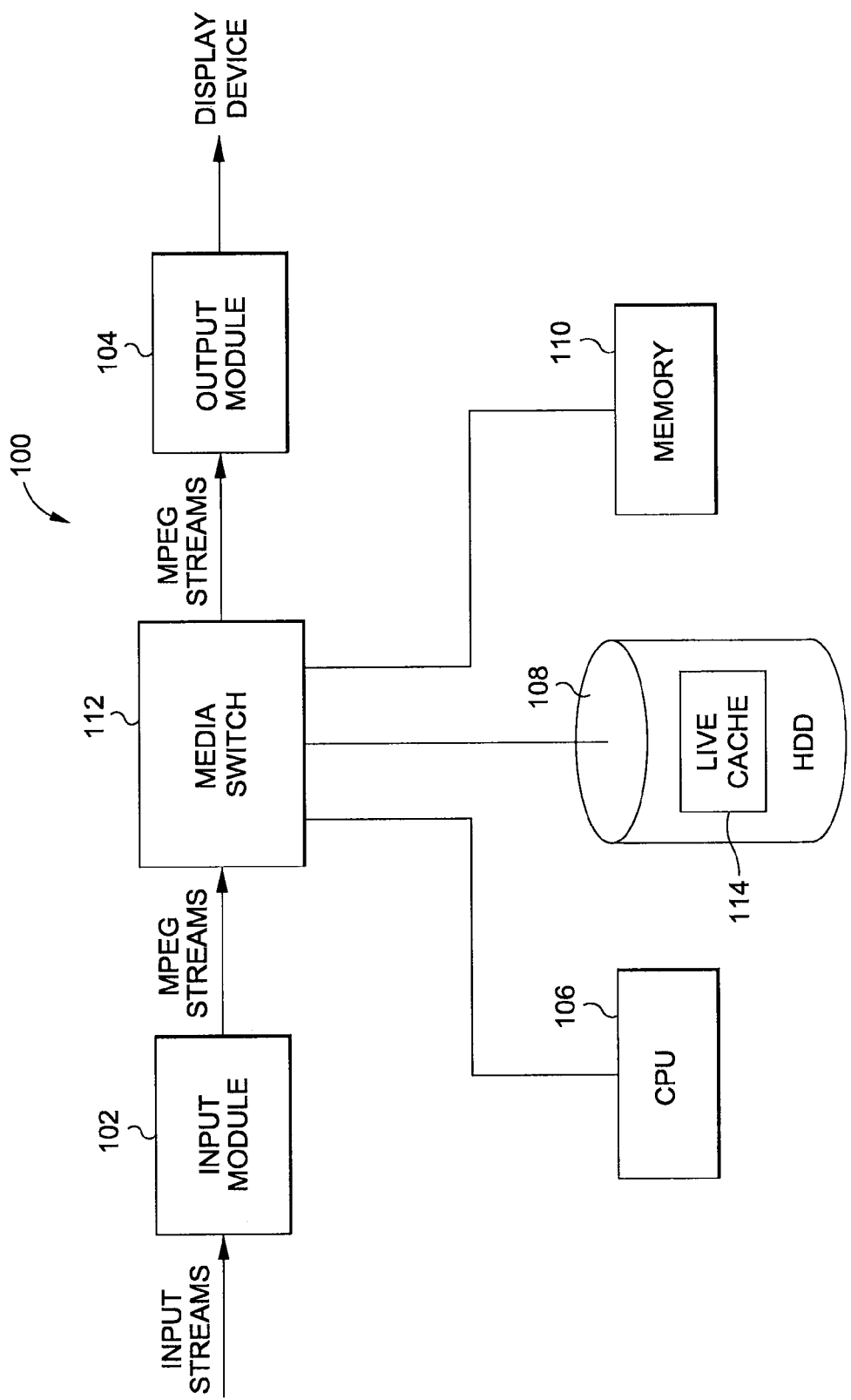
FIG. 1 depicts an embodiment of a system capable of implementing one or more aspects of the invention.

Referring now to the drawings, FIG. 1 illustrates an embodiment of a DVR system 100 capable of implementing one or more aspects of the invention. In the embodiment of FIG. 1, the system 100 includes an input module 102, a media switch 112, and an output module 104. In one embodiment, the input module 102 may accept video input streams in a multitude of forms (e.g., National Television Standards Committee (NTSC), PAL, Digital Satellite System (DSS), Digital Broadcast System (DBS), Advanced Television Standards Committee (ATSC), etc.). DBS, DSS, and ATSC are based on standards called Moving Pictures Experts Group 2 (MPEG2) and MPEG2 Transport. MPEG2 Transport is a standard for formatting the digital data stream from the source transmitter so that a receiver can disassemble the input stream to find programs in the multiplexed signal.

The input module 102 may produce MPEG streams. An MPEG2 transport multiplex supports multiple programs in the same broadcast channel, with multiple video and audio feeds and private data. The input module 102 may also be used to tune the channel to a particular program, extract a specific MPEG program out of it, and feed it into the rest of the system. Analog video signals may be encoded into a similar MPEG format using separate video and audio encoders, such that the remainder of the system is unaware of how the signal was obtained. Information may be modulated into the Vertical Blanking Interval (VBI) of the analog video signal in a number of standard ways. For example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals may be decoded by the input module 102 and passed to the other modules as if they were delivered via a MPEG2 private data channel.

In one embodiment, the media switch 112 mediates between a microprocessor CPU 106, hard disk or other storage device 108, which may or may not include the DVR system's live cache 114, and volatile memory 110. Input streams are converted to an MPEG stream and sent to the media switch 112. The media switch 112 buffers the MPEG stream into memory. If the user is watching real-time broadcast content, the media switch 112 may send the stream to the output module 104, as well as simultaneously write it to the hard disk or storage device 108.

The output module 104 may take the MPEG streams as input and produces an analog video signal according to a particular standard (e.g., NTSC, PAL, or other video standard). In one embodiment, the output module 104 contains an MPEG decoder, on-screen display (OSD) generator, analog video encoder and audio logic. The OSD generator may be used to supply images which will be overlaid on top of the resulting analog video signal. Additionally, the output module 104 can modulate information supplied by the program logic onto the VBI of the output signal in a number of standard formats, including NABTS, CC, and EDS.

Figure 2:
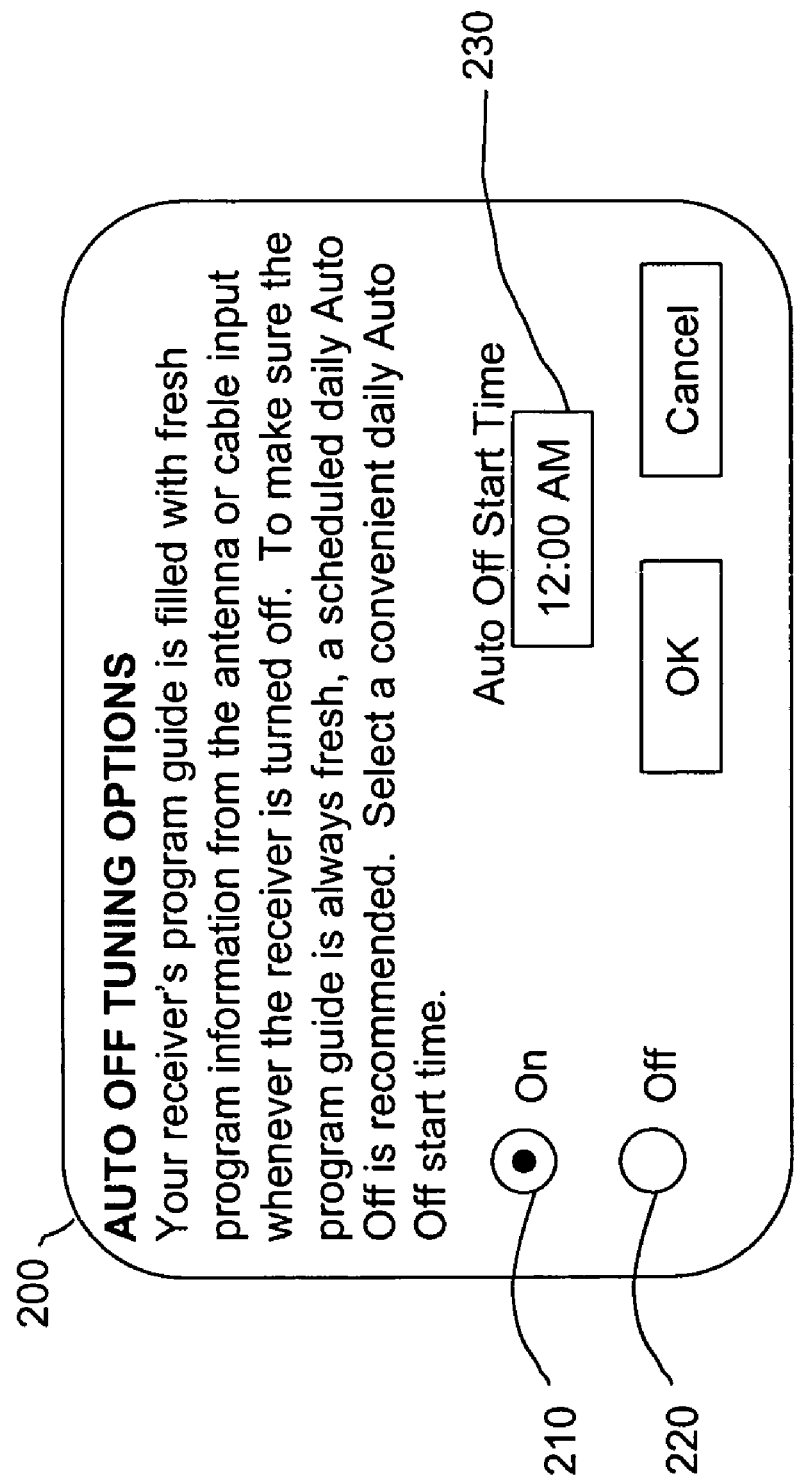
FIG. 2 is one embodiment of a graphical user interface screen usable to provide user-defined auto-off options.

Referring now to FIG. 2, depicted is an exemplary embodiment of a graphical menu interface usable to provide user-defined auto-off parameters for a set-top box, such as DVR system 100. In particular, FIG. 2 depicts one embodiment of a screen 200 which may be displayed on a display device that is coupled to the set-top box. From this screen 200, a user will be able to activate or deactivate the auto-off feature using radio buttons 210 and 220. In addition, the auto-off start time (e.g., the time at which the set-top box enters stand-by or auto-off mode) may also be user-defined using box 230. In one embodiment, a user input device (e.g., a remote control device) may be used to make the aforementioned selections and, when finished, to exit screen 200.

Referring now to FIGS. 3A-3B, depicted are exemplary embodiments of graphical menu interfaces which may be used to notify the user of the auto-off status. Screen 300 of FIG. 3A, for example, may be displayed some period of time (e.g., 60 seconds) prior to the set-top box system entering the auto-off state. This may be useful when the user is still viewing programming when the previously-set auto off start time is reached. If the user does not respond, then the system will enter the auto-off (or stand-by) state and screen 310 may then be displayed to indicate that the system is now in the auto-off (or stand-by) state. If, on the other hand, the user is still viewing programming then they may choose to "continue viewing," thereby delaying the auto-off sequence. In one embodiment, the auto-off state may be skipped for a full day when the "continue viewing" option is selected. In another embodiment, the auto-off state will be delayed by some predetermined amount of time (e.g., 30 minutes), at which point screen 300 may again be displayed. If the user does not respond the second time screen 300 is displayed, then the set-top box may at that point enter the auto-off state. However, if again the "continue viewing" option is selected, then the auto-off sequence will again be delayed, and so on.

Figure 4:
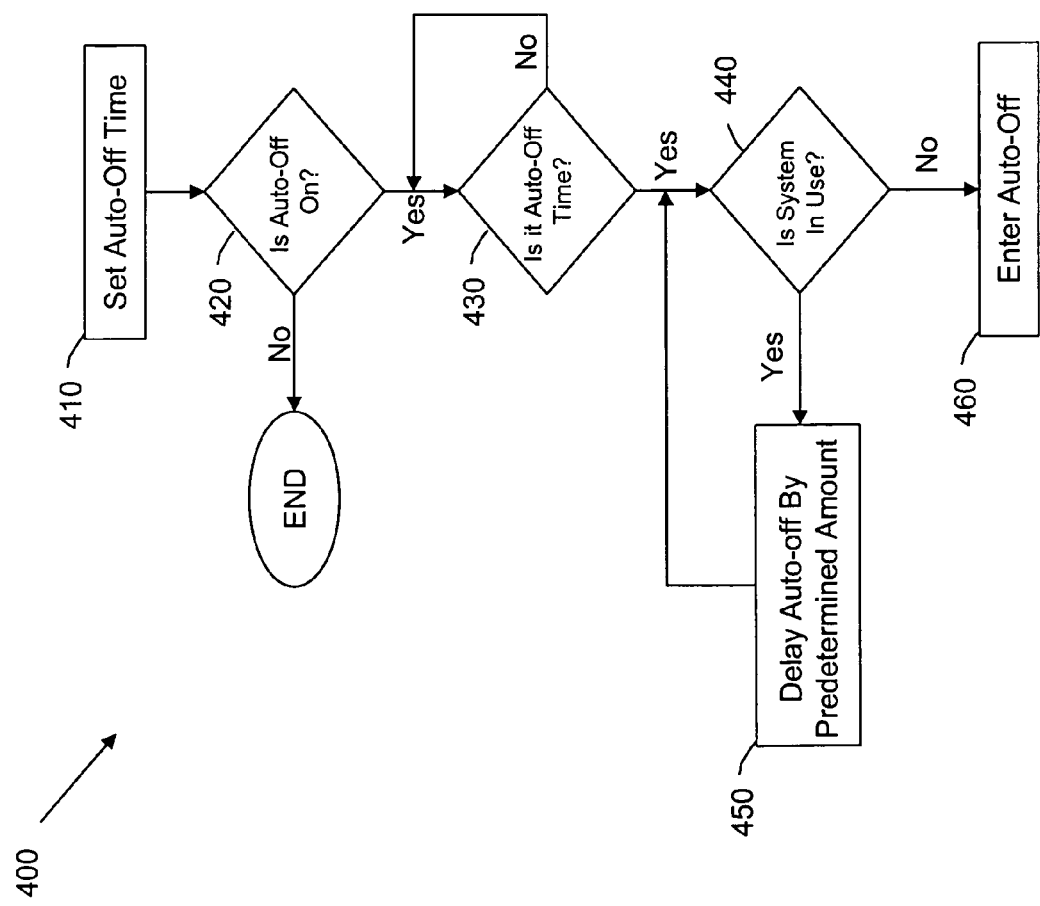
FIG. 4 is one embodiment of a process for entering an auto-off state, in accordance with the principles of the invention.

Referring now to FIG. 4, depicted is one embodiment of how a set-top box (e.g., DVR system 100) may enter the auto-off state. Process 400 begins with the user setting the auto-off time. This may be done, for example, using screen 200 of FIG. 2. Once the auto-off time has been set, then process 400 will continue to decision block 420 where a determination may be made as to whether the auto-off feature has been activated (e.g., using screen 200). If not, then the process 400 may terminate. If the auto-off feature is active, process 400 may continue to block 430 where it may be determined whether or not the auto-off start time has been reached (e.g., 12:00 am). If not, then process 400 will loop until the auto-off start time is reached. During this looping period, the user may interact with the set-top box and view programming in the normal course.

Once the auto-off start time has been reached, as determined by block 430, process 400 may then continue to block 440 where it is determined whether or not the system is in use. In one embodiment, such use may mean that there has been user interaction with the set-top box within the last X minutes. In another embodiment, this may mean that a program is currently being recorded (i.e., the set-top box's DVR functionality is in use). Regardless of the criteria used, if it is determined that the system is still in use then process 400 may delay the auto-off state by some predetermined amount at block 450. As previously mentioned, this may involve repeatedly delaying the auto-off state by the predetermined amount until there is no active user interaction and no program recording. Once these conditions are met, process 400 may then move to block 460 at which point the auto-off state is entered.

Figure 5:
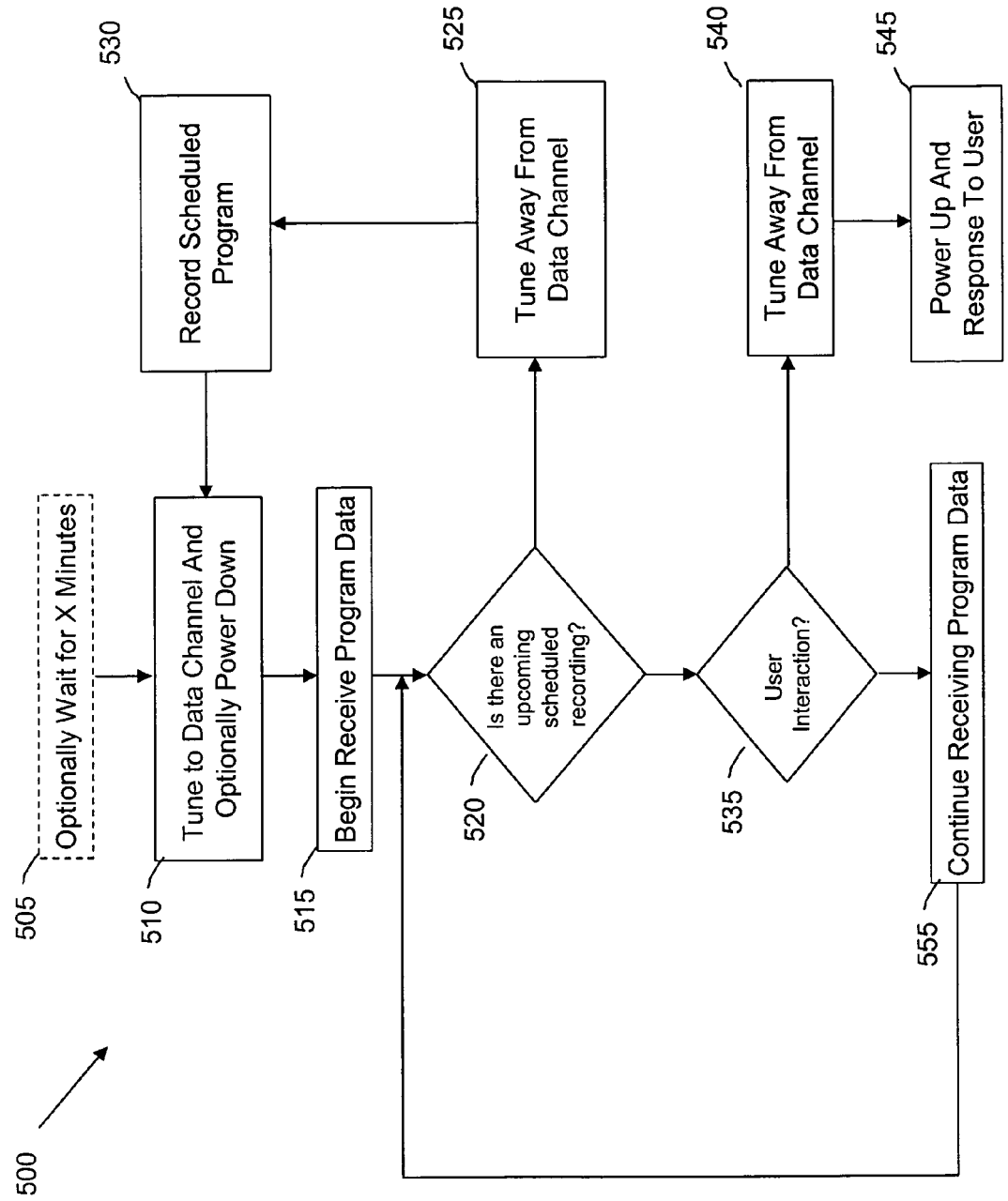
FIG. 5 is one embodiment of a process for receiving program data in accordance with the principles of the invention.

FIG. 5 is one embodiment of a process 500 for acquiring program data in accordance with the principles of the invention. Process 500 begins at block 505 with the system optionally waiting for a predetermined period of time before background tuning to the program data channel and/or optionally powering down the system's DVR functionality. This may be desirable to allow flexible use of the live cache functionality should the user decide to return to the unit shortly after entering the auto-off state. In one embodiment, the predetermined period of time equals the period of time that live programming is cached (e.g., 30 minutes). However, it should equally be appreciated that the optional delay of block 505 may be any other period of time.

At block 510, the set-top box may then tune to the data channel from which program guide data may be acquired. In addition, the set-top box may optionally power down its DVR functionality (e.g., spin down DVR hard drive). Once tune to the data channel, program data may then be received at block 515. In order to ensure that any scheduled recordings aren't missed, a determination may be made at block 520 as to whether there are any such upcoming recordings. In one embodiment, upcoming recordings are those scheduled recordings that will be broadcast during the time needed to fully acquire all program data from the program channel. If there is an upcoming scheduled recording, then process 500 will move to block 525 where the set-top box will tune away from the data channel to the channel on which the scheduled program is to be broadcast. Then, at block 530, the program may be freely recorded using the DVR capabilities of the set-top box. In one embodiment, it may be necessary to power up the DVR prior to being able to record the scheduled program.

If, on the other hand, there is no upcoming scheduled program then process 500 continue on to block 535. At block 535, a determination is made as to whether there is any user interaction. Such user interaction may, for example, include the user making any number of viewing selections (e.g., changing channel, pressing any button on a remote control device, recording a program, etc.).

If user interaction is detected, then process 500 will move to block 540 where the set-top box will tune away from the data channel, power up if needed, and respond to the detected user request (block 545). It should of course be understood that the system may continually monitor user interaction in the background, thus being able to instantly move to block 540 from any point in process 500.

If, on the other hand, no user interaction is detected at block 535 process 500 may continue to block 555 where the program data may continue to be received. In one embodiment, process 500 may continue to monitor for upcoming scheduled records and user interaction will receiving the program guide data. Moreover, once all of the program guide data has been received, the system may automatically exit the auto-off state, or alternatively, may remain in auto-off until there is either some form of user interaction or a scheduled recording.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for receiving program guide data during a stand-by mode of a digital video recorder, the method comprising:
    entering the stand-by mode at a user-defined time;
    tuning from a first channel to a program data channel while in standby mode;
    receiving program guide data from said program data channel while in standby mode;
    detecting when there is a user interaction;
    tuning back to said first channel in response to said user interaction;
    determining when there is a scheduled program recording during said receiving the program guide data and, when so,
    tuning to a second channel on which said scheduled program recording is being broadcast;
    recording said scheduled program recording; and
    tuning back to said program data channel after said recording.

2. The method of claim 1, further comprising powering down a hard drive of said digital video recorder after a predetermined time period of entering said stand-by mode, and wherein said tuning from the first channel comprises tuning from said first channel to the program data channel after said predetermined time period.

3. The method of claim 2, further comprising powering up said hard drive in response to said detecting the user interaction.

4. The method of claim 1, further comprising updating a program guide with said program guide data.

5. The method of claim 1, further comprising determining if there is current user activity at said user-defined time; and if so, delaying said entering the stand-by mode by a predetermined delay period.

6. The method of claim 5, wherein said current user activity comprises one of a currently recording program and a recent user instruction, provided to said digital video recorder.

7. The method of claim 6, wherein, prior to said delaying, the method further comprises presenting a user with an option to delay entering said stand-by mode.

8. A digital video recorder comprising:
    a hard drive;
    a memory containing one or more instruction sequences; and
    a processor coupled to said memory and to said hard drive, said processor to execute the one or more instructions to cause said digital video recorder to,
    enter a stand-by mode at a user-defined time;
    tune from a first channel to a program data channel while in standby mode;
    receive program guide data from said program data channel while in standby mode;
    detect when there is a user interaction;
    tune back to said first channel in response to said user interaction;
    determine when there is a scheduled program recording while receiving the program guide data and, when so,
    tune to a second channel on which said scheduled program recording is being broadcast;
    record said scheduled program recording; and
    tune back to said program data channel after said recording.

9. The digital video recorder of claim 8, wherein said memory further includes instructions to cause the processor to power down the hard drive after a predetermined time period of entering said stand-by mode, and wherein the digital video recorder is to tune to the program data channel only after said predetermined time period.

10. The digital video recorder of claim 9, wherein said memory further includes instructions to cause the processor to power up said hard drive in response to detecting the user interaction.

11. The digital video recorder of claim 8, wherein said memory further includes instructions to cause the processor to update a program guide of said digital video recorder with said program guide data.

12. The digital video recorder of claim 8, wherein said memory further includes instructions to cause the processor to determine if there is current user activity at said user-defined time; and if so, to delay entering the stand-by mode by a predetermined delay period.

13. The digital video recorder of claim 12, wherein said current user activity comprises one of a currently recording program and a recent user instruction provided to said digital video recorder.

14. The digital video recorder of claim 12, wherein, prior to delaying entering the stand-by mode, a user is presented with an option to delay entering said stand-by mode.

* * * * *